(12) United States Patent
Singh et al.

(10) Patent No.: US 9,712,953 B2
(45) Date of Patent: Jul. 18, 2017

(54) ASSET MONITORING AND TRACKING WITH A DISTRIBUTED BLUETOOTH LOW ENERGY (BTLE) SENSOR SYSTEM OF HETEROGENEOUS SENSORS OVER WIRELESS NETWORKS

(71) Applicants: Rajinder Singh, San Jose, CA (US); Ihab Abu-Hakima, Los Altos, CA (US); Gurpreet Singh Bal, Brampton (CA)

(72) Inventors: Rajinder Singh, San Jose, CA (US); Ihab Abu-Hakima, Los Altos, CA (US); Gurpreet Singh Bal, Brampton (CA)

( * ) Notice: Subject to any disclaimer, the term of this patent is extended or adjusted under 35 U.S.C. 154(b) by 0 days.

(21) Appl. No.: 14/941,611

(22) Filed: Nov. 15, 2015

(65) Prior Publication Data

US 2016/0105762 A1 Apr. 14, 2016

Related U.S. Application Data

(63) Continuation-in-part of application No. 14/883,604, filed on Oct. 14, 2015.

(60) Provisional application No. 62/063,924, filed on Oct. 14, 2014.

(51) Int. Cl.
*H04W 4/00* (2009.01)
*H04L 12/58* (2006.01)

(52) U.S. Cl.
CPC ............ *H04W 4/008* (2013.01); *H04L 51/38* (2013.01)

(58) Field of Classification Search
CPC .............................. H04L 51/38; H04W 4/008
See application file for complete search history.

(56) References Cited

U.S. PATENT DOCUMENTS

| 5,785,347 A | * | 7/1998 | Adolph | B60R 21/01556 180/273 |
|---|---|---|---|---|
| 2006/0047836 A1 | * | 3/2006 | Rao | H04L 63/0272 709/229 |
| 2009/0059899 A1 | * | 3/2009 | Bendelac | H04L 12/5692 370/352 |
| 2013/0049947 A1 | * | 2/2013 | Lanter | B60N 2/002 340/457.1 |

(Continued)

OTHER PUBLICATIONS

Evenflow Website, SensorSafe, http://www.evenflo.com/SensorSafe/, printed on Jul. 25, 2015, Evenflo Company Inc.

*Primary Examiner* — Lewis West
(74) *Attorney, Agent, or Firm* — Law Office of Dorian Cartwright; Dorian Cartwright

(57) ABSTRACT

One or more Bluetooth assets having a Bluetooth radio are associated with a specific set of business rules by enterprise users. Scan event data is received from at least one of a plurality of Bluetooth sensors having Bluetooth radios, wirelessly distributed around a communication network. The scan event data results from a scan event wherein the Bluetooth asset was within range of the at least one Bluetooth sensor. The scan event is analyzed against the business rules. Responsive to determining that at scan event meets at least one condition of at least one of the specific set of business rules, a notification can be sent. One specific implementation in a smart car seat safety system notifies a parent when a child is unintentionally left in a smart car seat.

13 Claims, 9 Drawing Sheets

(56) References Cited

U.S. PATENT DOCUMENTS

| | | | | |
|---|---|---|---|---|
| 2013/0109342 A1* | 5/2013 | Welch | ............... | B60N 2/002 455/404.2 |
| 2014/0277935 A1* | 9/2014 | Daman | ............ | G08G 1/127 701/36 |
| 2015/0274036 A1* | 10/2015 | Arad | ................. | B60N 2/002 340/573.1 |

\* cited by examiner

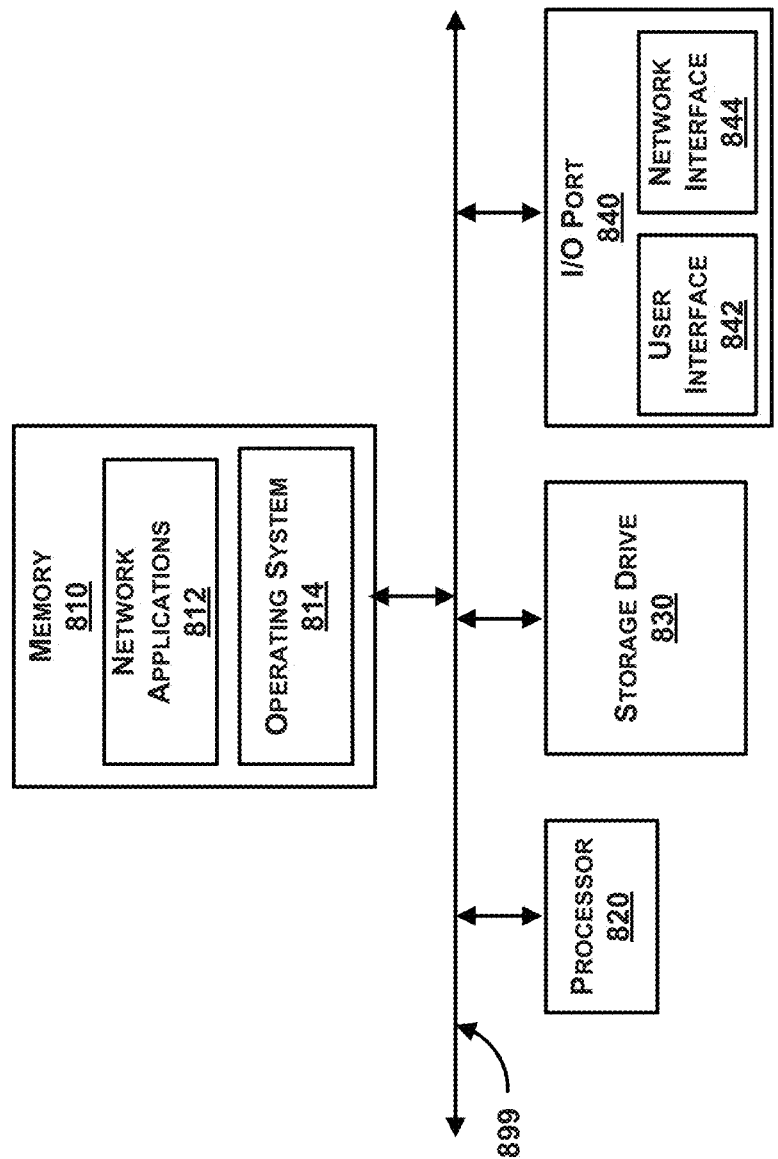

ASSET MONITORING AND TRACKING WITH A DISTRIBUTED BLUETOOTH LOW ENERGY (BTLE) SENSOR SYSTEM OF HETEROGENEOUS SENSORS OVER WIRELESS NETWORKS

CROSS-REFERENCE TO RELATED PATENT APPLICATIONS

This application claims the benefit as a continuation-in-part of U.S. application Ser. No. 14/883,604, filed on Oct. 14, 2015, by Rajinder SINGH, which in turn claims the benefit of U.S. Provisional Application No. 62/063,924, filed on Oct. 14, 2014, by Rajinder SINGH, the content of which are hereby incorporated by reference in their entirety.

FIELD OF THE INVENTION

The invention relates generally to Bluetooth networking, and more specifically, to asset tracking over a Bluetooth low energy (BTLE) sensor system connected to a wireless network.

BACKGROUND

Commercial asset tracking systems are prohibitively expensive, in large part due to the cost of deploying readers around large geographical areas. Many of the current systems are operated by large logistics operations such as UPS, Federal Express, shipping or trucking companies, having item monitoring or tracking as a core business need.

Furthermore, the conventional commercial asset tracking systems of large logistics operations are still limited by being closed systems. In other words, each company has privately-owned scanners or other readers and has to individually equip items with RFID tags or other tags. Adding to cost, employees currently have the burden of transporting items to stationary readers, or traveling to the times with portable readers.

What is needed is an asset monitoring and tracking system with a reduced deployment cost in resources and labor.

SUMMARY

The above-mentioned needs are met with methods, apparatus, and computer readable medium for aggregating a distributed BTLE sensor system over wireless networks.

In one embodiment, one or more Bluetooth assets having a Bluetooth radio are associated with a specific set of business rules by enterprise users. Scan event data is received from at least one of a plurality of Bluetooth sensors having Bluetooth radios, wirelessly distributed around a communication network. Scan event data results from a scan event wherein the Bluetooth asset was within range of the at least one Bluetooth sensor.

In an embodiment, the scan event is analyzed against the corresponding business rules. Responsive to determining that the scan event meets at least one condition of at least one of the specific set of business rules, a notification can be sent.

In other embodiments, a specific user device maintains a heartbeat relationship with a specific BTLE device. For example, a smart car seat having a pressure sensor to detect the presence of a child can be paired with a smart telephone executing a heartbeat mobile app. If the heartbeat relationship is broken (i.e., user device and BTLE sensor more out of range), such as when a parent accidentally leaves a child in the car seat, a notification can be sent to the smart telephone to alert the parent.

Advantageously, an existing and growing infrastructure of Bluetooth enabled devices is utilized for monitoring and tracking physical items, thereby drastically reducing the cost of deployment and operation.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 8 is a block diagram illustrating an exemplary computing device, according to an embodiment.

DETAILED DESCRIPTION OF PREFERRED EMBODIMENTS

The above-mentioned needs are met with methods, apparatus, and computer readable medium for aggregating a distributed BTLE sensor system over wireless networks. One of ordinary skill in the art, given the present disclosure, will recognize numerous variations that are within the spirit of the inventions herein.

I. Systems for Aggregating Distributed BTLE Sensor Data (FIGS. 1-4)

Figure 1A:
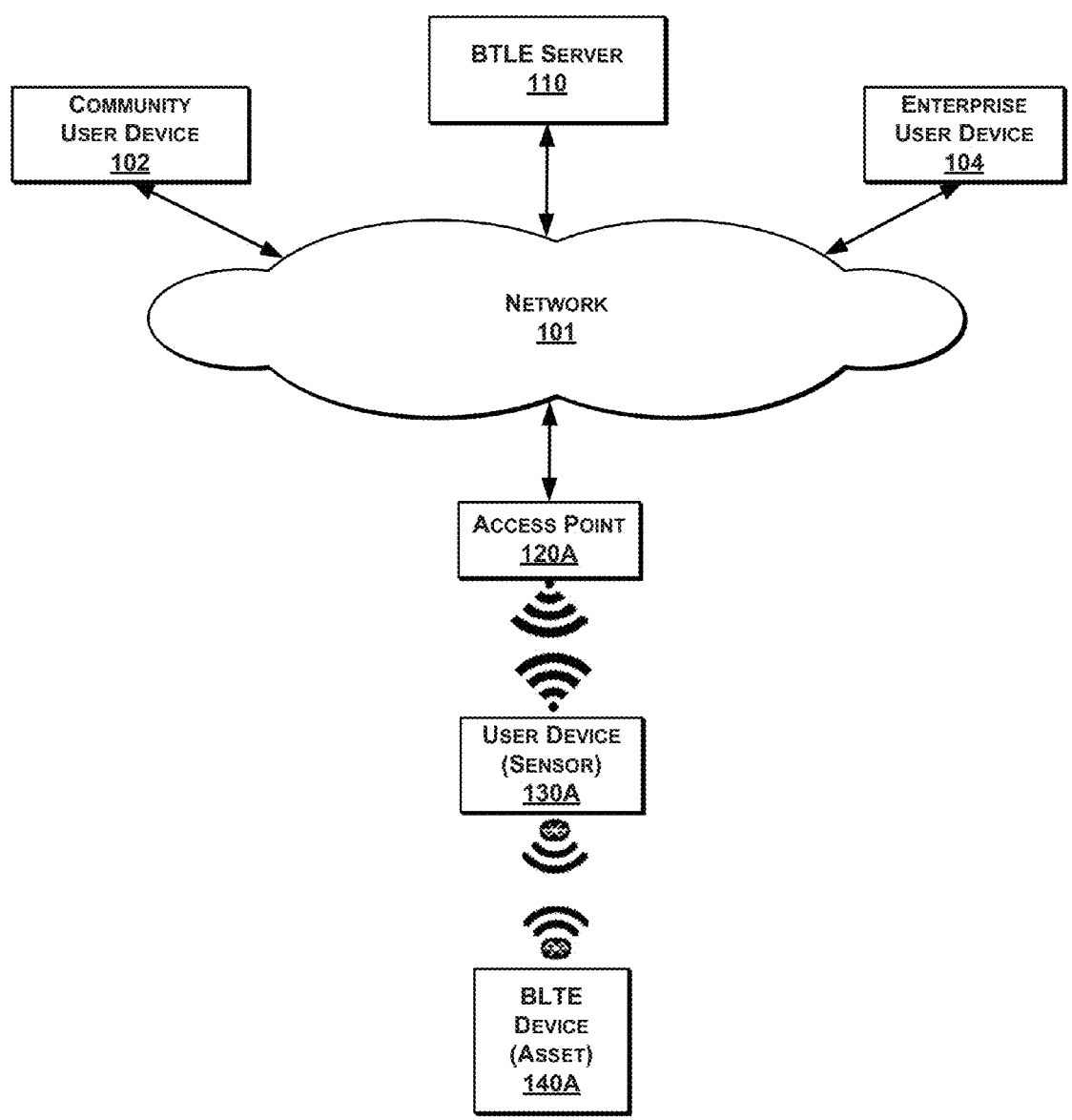
FIG. 1A is a high-level block diagram illustrating a distributed BTLE sensor system aggregated over wireless networks, according to an embodiment.
Figure 1B:
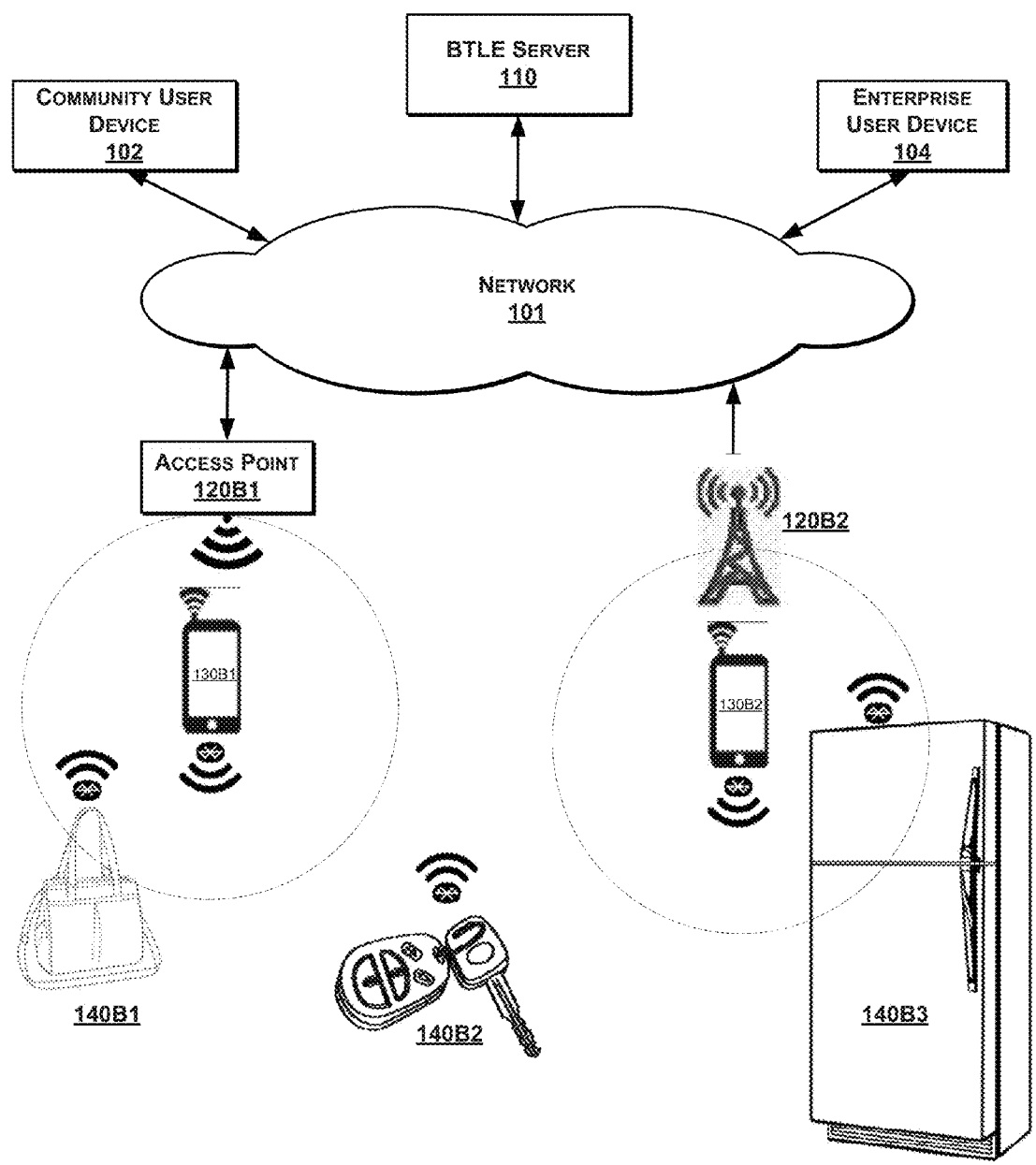
FIG. 1B is a block diagram illustrating a BTLE heartbeat sensor system, according to an embodiment.
Figure 1C:
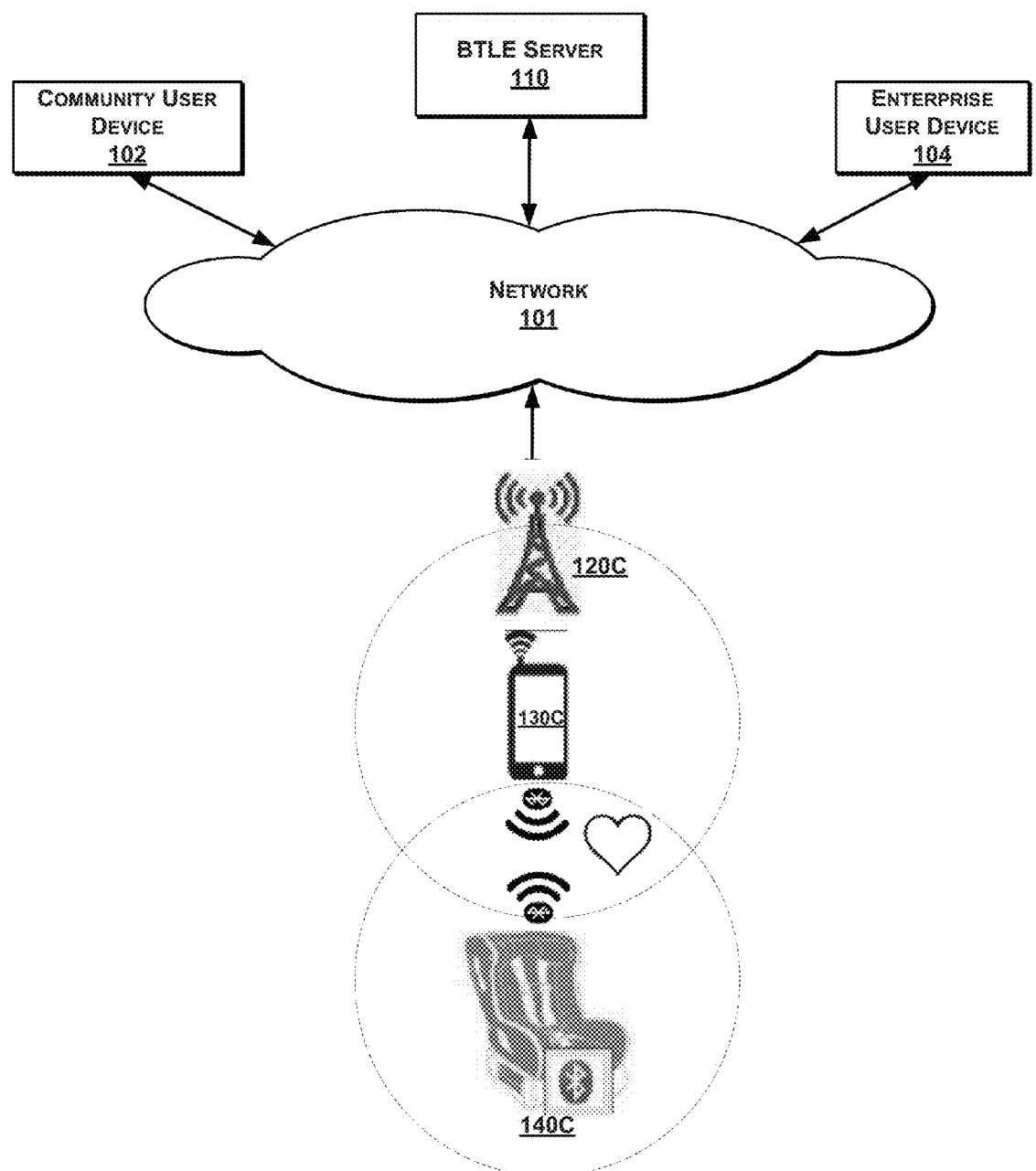
FIG. 1C is a block diagram illustrating a community BTLE tracking system, according to an embodiment.

FIG. 1A is a high-level block diagram illustrating a distributed BTLE sensor system 100 aggregated over wireless networks. Embodiments of specific uses are shown in FIG. 1B showing enterprise tracking, and FIG. 1C showing car seat monitoring. Multiple specific use cases are described more fully below.

Returning to FIG. 1A, the system 100 comprises a BTLE server 110, an access point 120A a community user device 102 and an enterprise user device 104, coupled to a network 101 preferably over wired connections. A user device (sensor) 130A is wirelessly coupled to the access point 120A over a Wi-Fi connection, and is wirelessly coupled to a BTLE device (asset) 140A over a Bluetooth connection. Additional network components can also be part of the system 100, such as firewalls, virus scanners, routers, switches, application servers, databases, as well as additional controllers, access points, access switches, controllers, stations, and the like. The network components can be implemented as hardware, software, or a combination of both.

In an embodiment, there are multiple different sensors in the system 100A. The more sensors reporting sensor events from different locations, the larger the coverage area for asset tracking. The sensors belong to independent and unassociated users. Different sensors can be different devices, the same devices from different manufacturers, or identical devices. An asset can be picked up by different sensors at different locations, the same sensor at different locations, or different sensors at the same locations. In some cases, sensor events are essentially random events because there is no relationship between the sensor and the asset other than both being associated generally with the system 100A (e.g., community asset tracking). In other cases, sensor events are planned (e.g., heartbeat monitoring).

The BTLE server 110 receives and analyzes sensor events from the user devices 120 coming into contact with BTLE devices 130. One embodiment can format sensor event data in a data portion of a frame including a unique identifier, a time/date stamp, a location, and any additional information for an implementation. Raw sensor event data is stored in a searchable format for later reference. Business rules can be applied to raw data to determine aggregate sensor data for the system 100 as a whole or just a particular user. Real-time alerts or notifications are sent out based on certain triggers, such as when an asset is found, an asset is in danger, a location has changed, a connection heartbeat is lost, a certain number of a set of assets have reached a predetermined condition, and the like.

The BTLE server 110 can be implemented in any of the computer devices discussed herein (e.g., see FIG. 8), a personal computer, a smart telephone, a server blade, a virtual storage network, or software as a service (SaaS), for example.

The access point 120A serves as a gateway to the network 101 for transmitting sensor events to the BTLE sensor 110. Typically, the user device 130A is associated with a BSSID assigned to the user access point 120A. Alternatively, a router, repeater or other network component can provide Wi-Fi access to the network 101. Alternative types of access include cellular gateways as one alternative shown in FIGS. 1B and 1C, Bluetooth gateways, and others. If there is no access point within range at the time of a sensor event, corresponding sensor event data can be stored until a connection is detected.

The user device 130A is Bluetooth-enabled sensor that reads information from BTLE devices 130 within radio range. For example, by enabling Bluetooth networking on a smart telephone, asset scanning occurs periodically as a user moves to different locations. Beacons are detected and include a unique identifier along with other data. In an embodiment, BTLE devices 140A considered assets within the system 100A are assigned unique identifiers having a recognizable prefix (e.g., first four characters are common for the system 100A). The user device 130A locally processes beacon data by adding time/data stamp and location information. In some cases, the user device 130A applies local rules to analyze data. One rule locally monitors heartbeats. Another rule identifies an asset sought by the system 100 and, in response, pairs with the BTLE device 140A to deliver data or interrogate for data, as discussed further below. Pairing can be limited to certain transactions and a certain amount of time because some sensors only support one Bluetooth pairing at a time.

The user device 130A comprises a mobile or stationary computerized device. The user device 130A can be a smart telephone, a tablet, a phablet, a personal computer, a server, or any other computing device (e.g., see FIG. 8). An embodiment includes a Wi-Fi radio and one or more Bluetooth radios. A software program, mobile app can be downloaded to and executed on the user device 130A, or be integrated to an operating system.

The BTLE devices 130 advertise a presence over a Bluetooth channel to pass information to the BTLE sensor server 110. Some BTLE devices 130 have integrated Bluetooth capability while others are retrofitted. In one case, BTLE tag comprises a small sticker with a (low-powered) Bluetooth transmitter, a small circuit, and a thin profile battery is attached to an item. The low power consumption can allow a battery life of months or years, and when the battery runs out, the sticker is detached, thrown away, and replaced. A security module can encrypt broadcast data. Some tags on stationary assets can be programmed with a fixed location for transmission to sensors that do not have integrated location technology (e.g., no GPS). Asset types can be encoded in unique identifiers (e.g., certain prefixes reserved for gun or for city bus).

In one embodiment, assets operate in a dual mode to also perform sensor functionality. In more detail, an asset can collect sensor events from other nearby assets and report to a sensor. For example, an asset placed at an intersection can collect sensor events from BTLE enabled vehicles that drive by the intersection and then report data during its own interaction with a sensor.

Figure 2:
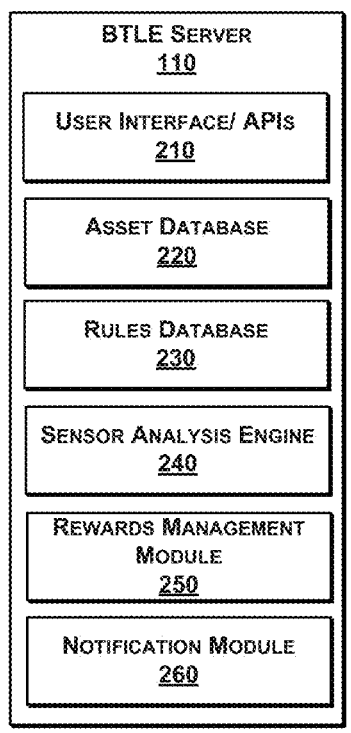
FIG. 2 is a more detailed block diagram illustrating a BTLE server of FIG. 1, according to an embodiment.

FIG. 2 is a more detailed block diagram illustrating a BTLE server 110 of FIG. 1, according to an embodiment. The BTLE server 110 comprises a user interface/APIs 210, an asset database 220, a rules database 230, a sensor analysis engine 240, a rewards management module 240, and a notification module 250, among other server software and hardware. Other examples can have different components. Further, the individual components can be locally stored and executed, be remotely executed by a software as a service, or be separate physical servers.

The user interface/APIs 210 provides an interaction portal for enterprise users and community users to log on to the BTLE server 110. Interactions can be provided through a search engine that can search general types of assets and related movement and use data. Also, user profiles can provide private interactions and secure data. Enterprise users can individually register or upload a group of assets and also configure rules for the assets. In another embodiment, enterprise users can search event data, set analysis parameters, and configure heart beat monitoring and asset tracking. Additionally, external processes can interact with the BLTE server 110 utilizing the user interface/APIs 210. APIs for sensors can be publicly available, or can be provided to partners on a more limited basis.

The asset database 220 can store registered assets associated with specific users and preferences. As sensor events occur, and as analysis results are determined by the sensor analysis engine 240. A relational database or table formats data into a searchable form. A rules database 230 stores rules applied against the registered assets. Some rules are general and are preconfigured for asset tracking, lost and found, or any of the specific case uses. Some rules are customized for a particular user, for a particular asset type, for a particular movement behavior, and the like.

The sensor analysis engine 240 applies rules against sensor events and stores results. Some results require an action to be taken. For example, the rewards management module 250 can manage incentives for community users to benefit from creating sensor events. In one case, a lost and found item has a monetary reward offer. Furthermore, the notification module 260 can send a notice to a sensor that is proximate to a lost item so that a user can secure the item. Other asset notifications are sent out, for example, due to movement, due to location, due to last usage, due to loss of heartbeat, or any other situation configured by rules. The notification module 260 outputs notifications to external resources such as SMS, e-mail and cellular systems as configured.

Figure 3:
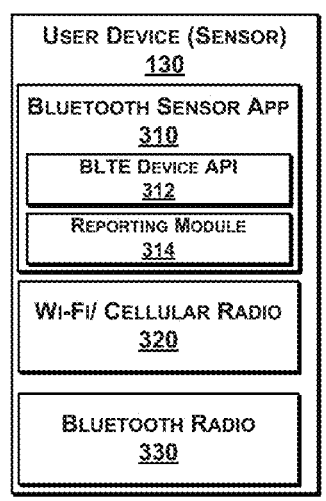
FIG. 3 is a more detailed block diagram illustrating a user device of FIG. 1, according to an embodiment.

FIG. 3 is a more detailed block diagram illustrating a user device 120 (generically referring to the access points 120A-C) of FIG. 1, according to an embodiment. The user device 120 comprises a Bluetooth sensor app 310, a Wi-Fi/cellular radio 320, and a Bluetooth radio 330.

Figure 4:
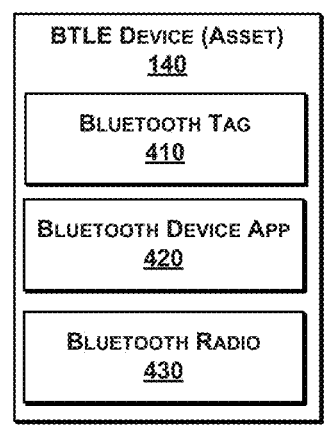
FIG. 4 is a more detailed block diagram illustrating a BTLE device of FIG. 1, according to an embodiment.

FIG. 4 is a more detailed block diagram illustrating a BTLE device 130 (generically referring to the BTLE devices 130A-D) of FIG. 1, according to an embodiment. The BTLE device 130 comprises a Bluetooth tag 410, 1 Bluetooth device app 420, and a Bluetooth radio 430.

A. Enterprise Asset Tracking

One use case of the system 100A or 100B is a community tracking app for enterprise asset tracking. Tracking for consumers or enterprises can be offered as a software as a service by the BTLE server 110. FIG. 1B is a block diagram illustrating a smart car app leveraging the system of FIG. 1A, according to an embodiment. Relative to FIG. 1A, BTLE assets are specified as a purse 140B1, a key chain 140B2 and a refrigerator 140B3. Secondly, one data path traverses a cellular network tower 120B2 for access to the network 101.

User devices 130B1, B2 can be independent of each other as smartphones of different manufacturers and having different, unassociated users. The user device 130B1 can be a smartphone belonging to a teenager sitting at a Starbucks hotspot in India. A woman sitting at a neighboring table carries the purse 140B1 into range. The other user device 130B2 can be an iPad stored in a briefcase belonging to an executive in California that is driving an automobile into a gas station. Pulling up to the pump, the refrigerator 140B3 storing sodas for purchase comes into range.

In another example, a company can track assets around a campus. An associated set of business rules can assign a value for each tracked asset and define depreciation rules and policies. When depreciation reaches a certain threshold, the last location is known so that the asset can be decommissioned and replaced. A different set of rules can alert for policy violations, such as when assets are taken off-campus. Tags can be programmed to automatically lock assets found off-campus (e.g., shut down asset or change security code) and to automatically unlock assets brought on-campus (e.g., by an authorized BTLE module). A verification process can be periodically initiated in which an asset is located, locked or unlocked, and a notification is sent.

Many other implementations are possible. For instance, a company can track movements of physical assets as an indicator of consumer behavior. A manufacturer can track how long the refrigerator 140B3 is in use. Also, a picture of certain assets within range can be requested. Further, a parent can enable a child's book bag with a sensor tag to track movements of the child, and a pet owner can track a dog having a Bluetooth enabled dog collar. Inconspicuous tracking by spouses or law enforcement is also possible. Moreover, groups at an amusement park or other trip can be passively synced by carrying Bluetooth tags. Assets can be tracked for a treasure hunt game.

Another use for asset tracking, is dangerous asset proximity detection. Opposite to a user's desire for proximity to certain assets, certain undesirable assets such as guns, untrusted family members, or sexual predators can be detected by recognizing associated BTLE tags.

Corresponding methods are discussed below with respect to FIG. 6A.

B. Heartbeat Monitoring: Baby Car Seat Safety App

A second use case of the system 100A or 100C is a monitoring app for smart car seat safety. FIG. 1C is a block diagram illustrating a smart car app leveraging the system of FIG. 1A, according to an embodiment. The data path originates form a car seat asset 140C.

At a high-level, the system 100C sends notifications when a child is left in a vehicle. For example, smart car system maintains a Bluetooth paired heartbeat between a modified car seat and a smart phone to automatically alert a responsible person when children are unsafely left inside of vehicles, as detected by a loss of the Bluetooth paired heartbeat. One of ordinary skill in the art will recognize many other possible implementations which and are not limited by the details provided below. For example, the same principles can be applied to a sensor and alert systems for pets, special need adults, precious objects, or any other desirables inadvertently left inside of vehicles.

The car seat 140C can be a standard car seat that is modified with a stick on Bluetooth tag, or be a smart car seat having an integrated communication module embedded during manufacture. The car seat 140C can be used to hold or boost an infant, toddler or small child in a seat having a smaller form factor cavity providing for a safer transport for these individuals while riding in an automobile. In other embodiments, the car seat 140C can be a pet cage, a full size car seat, or the like.

The communication module can comprise a pressure sensor coupled to a processor, a transceiver and a power source. The pressure sensor detects when an individual is present in the car seat 140C based on a minimum weight of, for example, 10 pounds being detected. The processor analyzes data form the pressure sensor and the transceiver. The transceiver, in one embodiment, is a Bluetooth low energy transceiver with an RF radio for transmitting and receiving data. The power source can be a rechargeable battery, a solar-powered battery, or a connection to an automobile battery. In other embodiments, sensors such as a motion detector or temperature sensor can be used alone or in combination with the pressure sensor, depending upon the application.

In a first scenario, no child (or pet, or special needs adult, etc.) is in the seat. Because a pressure sensor does not activate a transceiver, the system remains off or in a low power mode.

In a second scenario, a child is in the car seat. This time, a pressure sensor does activate a transceiver for pairing with a wireless host. The pairing can be automated or can require manual confirmation. Periodically, a heartbeat message is sent between the car seat and the wireless host to verify that the two remain within proximity. Heartbeats can be sent from either device. In one implementation, proximity is defined by the limits of Bluetooth connectivity. In other implementations, locations of both components are determined and a distance is determined with respect to an allowable threshold.

In a third scenario, a child is safely removed from the car seat. Once the child is removed, the pressure sensor deactivates the transceiver or merely unpairs from the wireless device. A heartbeat is no longer required at this point. The system can turn off, or remain in a low power mode for a certain period of time.

In a fourth scenario, a child is unsafely left in the car. A heartbeat is no longer detected because the wireless device is no longer in proximity with the car seat. In response, the wireless device notifies a BTLE server of the event. In turn, the database records are searched for appropriate notification procedures by the notification server. For example, a beep or SMS message at a smartphone can alert a parent of the mistake.

In a fifth scenario, a smartphone loses power. The child may or may not be in the child seat. In one embodiment, the management server initiates an alert because no heartbeat has been sent from the wireless device. In this case, an e-mail can be sent or an alternative telephone number can be used to send the alert. In another embodiment, the car seat can also recognize the missing heartbeat and connect to a Bluetooth system in the vehicle as an alternative mechanism for alerts. In still another embodiment, the car seat uses Wi-Fi or a cellular data network as an alternative form of communication.

In a sixth scenario, both a child and the wireless device are inadvertently left behind in a vehicle. Process can be similar to the fifth scenario once the wireless device exhausts power. The system can also generate alert if the pairing has exceeded a configured time limit (e.g., pairing time exceeds one hour). The system can generate an informative alert, or a caution that is not as pronounced. During long drives when child and parents are all in the car, this alert may not require any action.

In yet another embodiment, a heartbeat is picked up by an alternative device. That is, if mom loses a heartbeat, a system can automatically check for dad, nanny, or any others within a trusted circle as evidence that the child remains within safety. If no alternative or secondary heartbeat is established, alarms are set off.

Corresponding methods are discussed below with respect to FIG. 6B.

C. Lost and Found Assets

One use involves a lost and found app. An enterprise user uploads asset information and sets rules for notifying a Bluetooth sensor in real-time with a scan event. Rewards can also be offered by owners for incentive. In more detail, once a scan event has been identified as involving the lost item, a notification can be sent to back to the sensor along with identifying information. An alert quickly makes a user of the sensor that a lost item is within range to allow for a possible recovery.

II. Methods for Aggregating Distributed BTLE Sensor Data (FIGS. 5-7)

Figure 5:
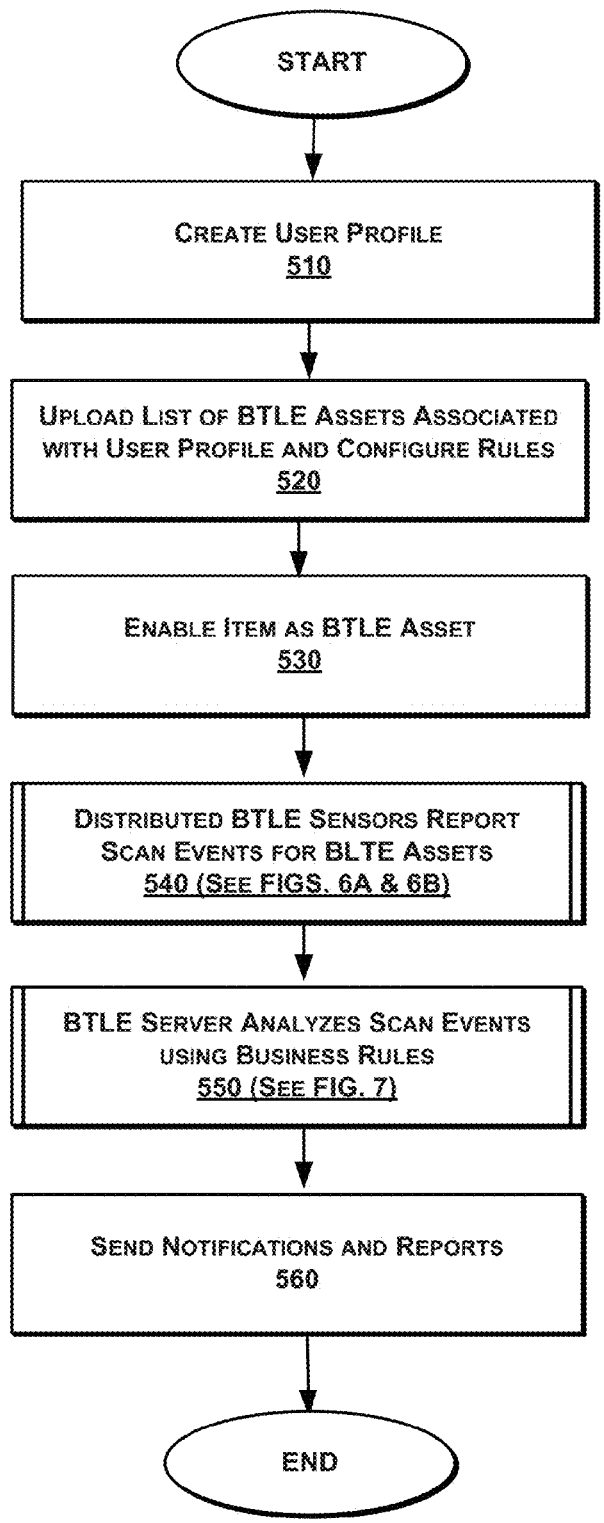
FIG. 5 is a high-level flow chart illustrating a method of aggregating a distributed BTLE sensor system over wireless networks, according to an embodiment.

FIG. 5 is a high-level flow chart illustrating a method 500 of aggregating a distributed BTLE sensor system over wireless networks, according to an embodiment. The order of steps and grouping of functions in each step are only examples of many possible variations.

A user profile is created (step 510). An asset list associated with the user profile is uploaded and rules are configured (step 520). An item is enabled as a BTLE asset (step 530). To do so, a BTLE tag and/or software are set up at the BTLE asset. Scan events for BTLE assets are reported by distributed BTLE sensors (step 540), as described in more detail below. Scan events are analyzed using business rules by a BTLE server (step 550), also as described below in more detail. Notifications and/or reports are sent based on the analysis (step 560).

Figure 6A:
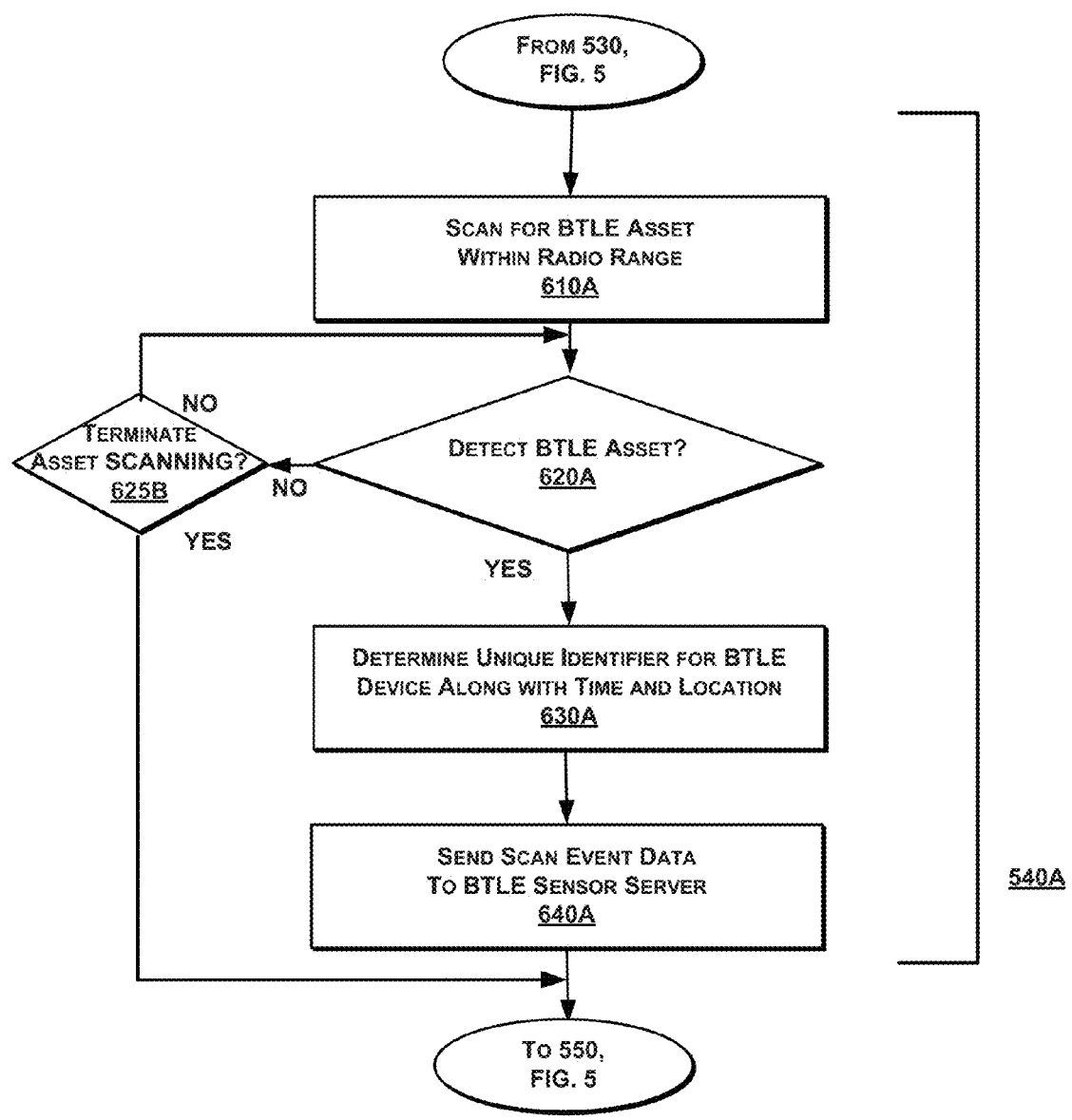
FIGS. 6A and 6B are more detailed flow charts illustrating a step of reporting scan events from distributed user devices of the method of claim 5, according to an embodiment.
Figure 7:
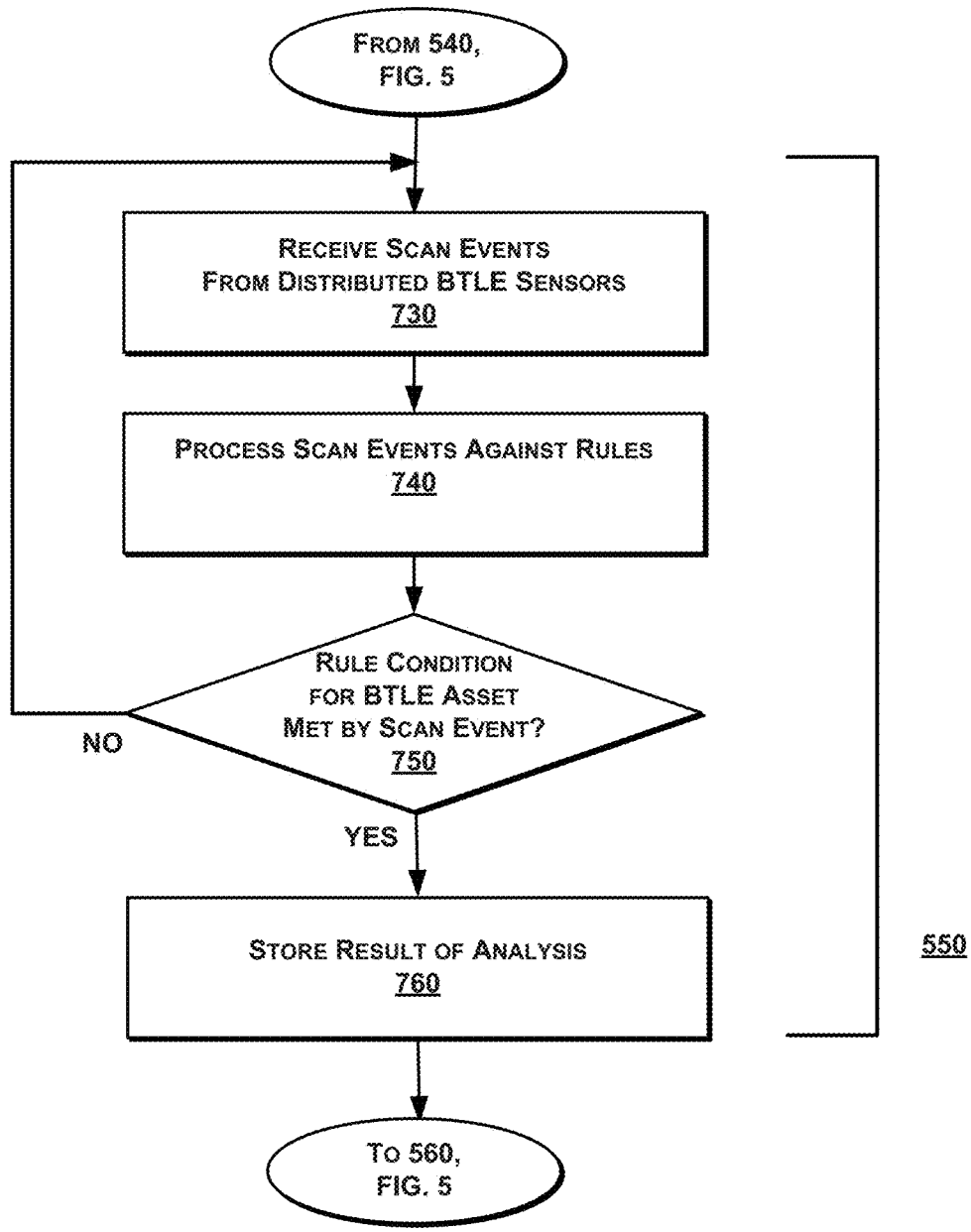
FIG. 7 is a more detailed flow chart illustrating a step of analyzing scan events using business rules of the method of claim 5, according to an embodiment.

FIG. 6A is a more detailed flow chart illustrating the step 520 of reporting scan events from distributed user devices of the method of claim 5, according to an embodiment.

BTLE assets within radio range are scanned (step 610A). If a BTLE asset is detected (step 620A), a unique identifier for the BTLE device is determined along with a time/date and location (step 630A). Scan event data is sent to the BTLE sensor server (Step 640A). Asset scanning can continue until terminated (step 625B), for instance, as instructed by a BTLE server, when powered off, or when an app stops executing.

Figure 6B:
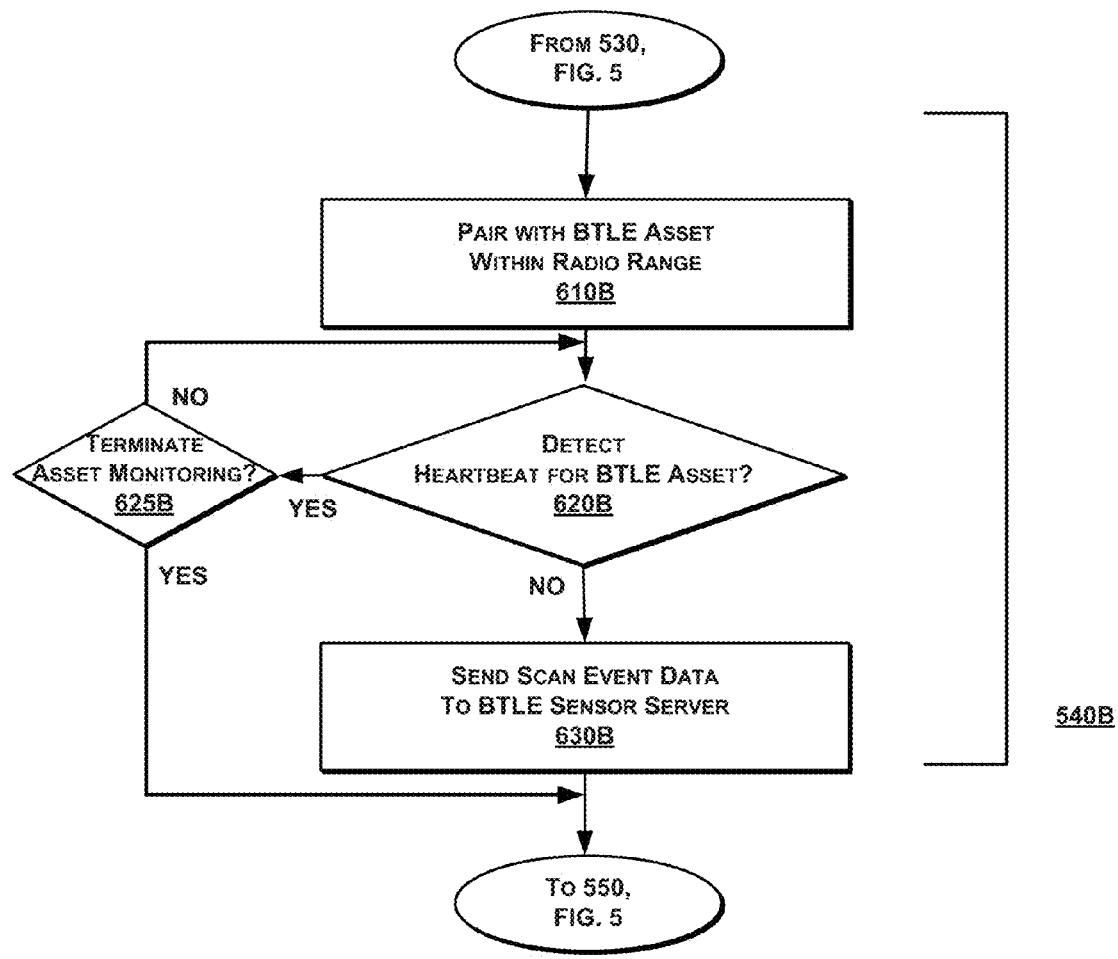

FIG. 6B is another example of a detailed flow chart illustrating the step 520 of reporting scan events from distributed user devices of the method of claim 5, according to an embodiment.

A BTLE asset within radio range is paired with a BTLE sensor (step 610B). If a heartbeat for the BTLE asset is detected (step 620B), scan event data is sent to a BTLE server (step 630B). Heartbeat monitoring can be terminated by a BTLE server (step 625B).

FIG. 7 is a more detailed flow chart illustrating the step 530 of analyzing scan events using business rules of the method of claim 5, according to an embodiment.

Scan events are received from distributed BTLE sensors (step 730). Scan events are processed against business rules (step 740). If a rule condition for a BTLE asset is met by a scan event (step 750), a result of the analysis is stored (step 760). Analysis continues until stopped (step 755).

We claim:

1. A method, in a server, for tracking physical assets with wireless Bluetooth low energy (BTLE) sensors distributed around a data communication network, the method comprising the steps of:
   storing a plurality of Bluetooth assets in a database, each of the Bluetooth assets comprising a physical asset having a Bluetooth radio;
   associating each of the plurality of Bluetooth assets with a specific set of business rules;
   receiving first scan event data from a first Bluetooth sensor of a plurality of Bluetooth sensors having Bluetooth radios, at least two of the plurality of Bluetooth sensors being independently owned and operated from each other, the plurality of Bluetooth sensors being wirelessly connected to the data communication network,
   wherein the first scan event data originates from a first scan event wherein a first Bluetooth asset was detected within range of the first Bluetooth sensor, the first Bluetooth sensor being independently owned and operated from the first Bluetooth asset;
   analyzing the first scan event data against the specific set of business rules;
   determining that the first scan event data meets at least one condition of at least one of the specific set of business rules;
   and responsive to the determination, sending a notification associated with the condition.

2. The method of claim 1, wherein the specific set of business rules establishes a heartbeat relationship between any of the plurality of Bluetooth sensors and the first Bluetooth asset, wherein the heartbeat relationship requires that a scan event be sent at predetermined times confirming that the first Bluetooth asset remains within range of the first Bluetooth sensor.

3. The method of claim 1, wherein the first Bluetooth sensor, the first Bluetooth device, and the specific set of business rules are commonly controlled by a single entity.

4. The method of claim 1, wherein the first Bluetooth device and the specific set of business rules are commonly controlled by a single entity, and the first Bluetooth sensor is controlled by a separate entity.

5. The method of claim 1, further comprising:
receiving a second scan event from a second one of the plurality of Bluetooth sensors, the scan event data originating from a second scan event wherein the first Bluetooth asset was within range of the second Bluetooth sensor, wherein the first Bluetooth sensor and the second Bluetooth sensor are controlled by separate entities.

6. The method of claim 1, further comprising:
receiving a second scan event from a second one of the plurality of Bluetooth sensors, the second scan event data originating from a second scan event wherein the first Bluetooth asset was within range of the second Bluetooth sensor, wherein the first scan event and the second scan event occur at different locations.

7. The method of claim 1, wherein the specific set of business rules is set to find a lost item, and wherein the notification is sent to the first Bluetooth sensor temporal to the scan event and identifies the first Bluetooth asset along with a lost status.

8. The method of claim 1, wherein the step of sending a notification comprises at least one of: sending an e-mail, sending an SMS message, spawning an alert on a display, and initiating a telephone call.

9. The method of claim 1, wherein the first scan events occur without pairing between the at least one Bluetooth sensor and the Bluetooth asset.

10. The method of claim 1, wherein the first scan event data further comprises at least one of: a time/date stamp and a location.

11. The method of claim 1, wherein the specific set of business rules describes a limited geographical area in which the first Bluetooth asset is allowed.

12. The method of claim 1, wherein the specific set of business rules describes community asset tracking.

13. A non-transitory computer readable medium storing code that, when executed by a process, performs a method for tracking physical assets with wireless Bluetooth low energy (BTLE) sensors distributed around a data communication network, the method comprising the steps of:
storing a plurality of Bluetooth assets in a database, each of the Bluetooth assets comprising a physical asset having a Bluetooth radio;
associating each of the plurality of Bluetooth assets with a specific set of business rules;
receiving first scan event data from a first Bluetooth sensor of a plurality of Bluetooth sensors having Bluetooth radios, at least two of the plurality of Bluetooth sensors being independently owned and operated from each other, the plurality of Bluetooth sensors being wirelessly connected to the data communication network,
wherein the first scan event data originates from a first scan event wherein a first Bluetooth asset was detected within range of the first Bluetooth sensor, the first Bluetooth sensor being independently owned and operated from the first Bluetooth asset;
analyzing the first scan event data against the specific set of business rules;
determining that the first scan event data meets at least one condition of at least one of the specific set of business rules; and
responsive to the determination, sending a notification associated with the condition.

* * * * *